(12) United States Patent
Suga et al.

(10) Patent No.: US 6,445,504 B1
(45) Date of Patent: Sep. 3, 2002

(54) LIGHT DIFFUSING FILM AND USE THEREOF

(75) Inventors: Taiji Suga; Fumihiro Arakawa, both of Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/588,299

(22) Filed: Jun. 7, 2000

(30) Foreign Application Priority Data

Jun. 11, 1999 (JP) .......................................... 11-164649

(51) Int. Cl.[7] .............................. G02B 5/02; G02F 1/13; F21V 7/04
(52) U.S. Cl. ............................ 359/599; 349/64; 362/31
(58) Field of Search ................................ 359/599, 707; 349/52–68; 362/39, 26; 385/110–119

(56) References Cited

U.S. PATENT DOCUMENTS

| | | | |
|---|---|---|---|
| 4,618,552 A | * 10/1986 | Tanaka et al. | 430/60 |
| 5,485,291 A | * 1/1996 | Qiao et al. | 349/65 |
| 5,592,332 A | * 1/1997 | Nishio et al. | 359/619 |
| 5,598,280 A | * 1/1997 | Nishio et al. | 349/64 |
| 5,944,405 A | * 8/1999 | Takeuchi et al. | 362/31 |

FOREIGN PATENT DOCUMENTS

| | | | | |
|---|---|---|---|---|
| EP | 495273 A1 | * | 7/1992 | 359/599 |
| WO | 96-05466 | * | 2/1996 | 359/599 |

* cited by examiner

*Primary Examiner*—Thong Nguyen
(74) *Attorney, Agent, or Firm*—Parkhurst & Wendel, LLP

(57) ABSTRACT

A light diffusing film is provided which can be easily and stably produced and possesses excellent light diffusing properties, and, especially when used in combination with a prism sheet, can improve the luminance of light from a light source. A light diffusing film 1 comprises a transparent substrate 2 and a light diffusing layer 3 provided on at least one side of the transparent substrate 2. The light diffusing layer 3 is substantially free from light diffusing particles and is formed of an ionizing radiation-cured resin having on its surface fine concaves and convexes. The light diffusing layer 3 has a surface roughness of 1 to 10 μm in terms of ten-point average roughness Rz and an average inclination θa of 5 to 20 degrees.

7 Claims, 4 Drawing Sheets

LIGHT DIFFUSING FILM AND USE THEREOF

TECHNICAL FIELD

The present invention relates to a light diffusing film, and more particularly to a light diffusing film which, especially when used in various displays, lighting equipment, and display boards, can realize high luminance and high visibility, and a process for producing the same, a surface light source, and a display device.

BACKGROUND OF THE INVENTION

In various displays, lighting equipment, or display boards, light diffusing films are used for uniformly spreading light from a light source to enhance visibility.

Conventional light diffusing films include: a light diffusing film using a film comprising a light diffusing agent dispersed in a film substrate of a light-transparent rein, such as polymethyl methacrylate resin or polycarbonate resin; a light diffusing film comprising a film substrate and concaves and convexes provided directly on the surface of the film substrate, the film substrate being formed of a light-transparent resin, such as polymethyl methacrylate resin or polycarbonate resin, or being formed of a light-transparent resin, such as polymethyl methacrylate resin or polycarbonate resin with a light diffusing agent dispersed therein; and a light diffusing film having a light diffusing layer formed by coating a film substrate with a composition comprising a light diffusing agent compounded and dispersed in a light-transparent resin.

As shown in FIG. 9, a light diffusing film 31 is generally provided between a light-guide material 33 having scattering dots 32 and a liquid crystal panel 34 and serves to diffuse light from a light source 35. A large number of light diffusing films have hitherto been proposed in the art.

In some cases, a prism sheet is disposed between the light source and the liquid crystal panel from the viewpoint of focusing light from the light source to enhance luminance at the front of the liquid crystal panel. In this case, the prism sheet is used in combination with the light diffusing film.

Up to now, however, the structure of the combination of the prism sheet with the light diffusing film has not been fully taken into consideration. Consequently, disadvantageously, the prism sheet could not have satisfactorily improved luminance.

An attempt to provide a light diffusing film compatible with the optical properties of the prism sheet for the purpose of solving the above problem has posed a problem that, in prior art methods, such light diffusing films capable of attaining the above purpose are difficult to produce and cannot be stably produced.

Further, when the use of a light diffusing film is contemplated, the function of concealing the scattering dots provided on the light-guide plate should be imparted to the light diffusing film.

DISCLOSURE OF THE INVENTION

Under these circumstances, the present invention has been made, and it is an object of the present invention to provide a light diffusing film which can be easily and stably produced and, in addition, possesses excellent light diffusing properties, and, especially when used in combination with a prism sheet, can improve the luminance of light from a light source, a process for producing the same, a surface light source, and a display device.

The above object of the present invention can be attained by a light diffusing film, comprising: a transparent substrate; and a light diffusing layer stacked on at least one side of the transparent substrate, the light diffusing layer being formed of an ionizing radiation-cured resin, the light diffusing layer having on its surface fine concaves and convexes, the light diffusing layer having a surface roughness of 1 to 10 $\mu$m in terms of ten-point average roughness Rz and an average inclination $\theta_a$ of 5 to 20 degrees.

According to a preferred embodiment of the present invention, the light diffusing layer is free from light-diffusing particles.

According to another preferred embodiment of the present invention, the light diffusing film has been constructed so as to have a haze of 85 to 95% and a total light transmittance of 80 to 90%.

According to a preferred embodiment of the present invention, the light diffusing film has been constructed so that, when the angle of light incident on the light diffusing film is 60 to 80 degrees to the normal of the light diffusing film, the peak of the angle of outgoing of light is 30 to 50 degrees to the normal of the light diffusing film.

According to the present invention, the light diffusing film may further comprises a matte layer on the transparent substrate on its side remote from the light diffusing layer.

According to the present invention, there is provided a process for producing a light diffusing film, comprising the steps of:

winding a transparent substrate on the circumference of a roll form having on its surface fine concaves and convexes while applying an ionizing radiation-curable resin in a fluid state onto the surface of the roll form and rotating the roll form while bringing the transparent substrate into contact with the ionizing radiation-curable resin;

during the rotation of the roll form, bringing the ionizing radiation-curable resin into intimate contact with the transparent substrate and curing the ionizing radiation-curable resin; and separating the transparent substrate together with the cured resin from the roll form.

Further, the present invention includes a surface light source comprising:

a light-guide plate which permits light to enter therein from a side end thereof and to go out from an outgoing face orthogonal to an incident face;

a light source installed on at least one end of the light-guide plate; and the above light diffusing film provided on the outgoing face of the light-guide plate.

The surface light source may further comprise a prism sheet provided on the light diffusing film.

The present invention also includes a display device comprising a display panel provided on the above surface light source.

BEST MODE FOR CARRYING OUT THE INVENTION

Embodiments of the present invention will be described in more detail with reference to the accompanying drawings.

Figure 1:
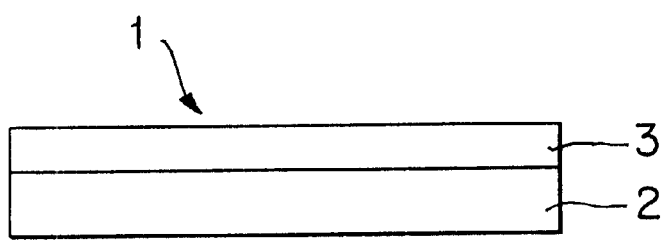
FIG. 1 is a schematic cross-sectional view showing the basic layer construction of one embodiment of the light diffusing film according to the present invention.

As shown in FIG. 1, a light diffusing film 1 according to one embodiment of the present invention comprises a light diffusing layer 3 provided on a transparent substrate 2. The light diffusing layer 3 is free from light diffusing particles, and is formed of an ionizing radiation-cured resin having on its surface fine concaves and convexes. The surface of the light diffusing layer 3 has a ten-point average roughness Rz of 1 to 10 $\mu$m and an average inclination $\theta$a of 5 to 20 degrees.

Figure 2:
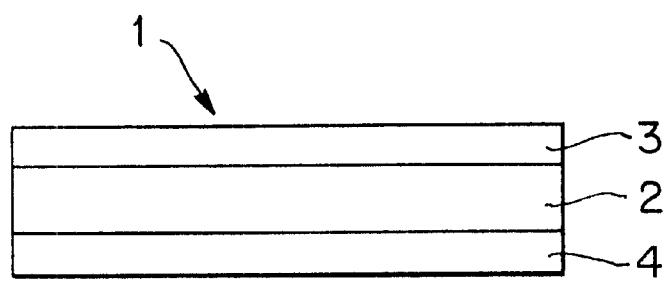
FIG. 2 is a schematic cross-sectional view showing the basic layer construction of another embodiment of the light diffusing film according to the present invention, wherein a matte layer has been additionally provided on the light diffusing film shown in FIG. 1.

As shown in FIG. 2, according to the present invention, if necessary, a matte layer 4 may be provided on the surface of the transparent substrate 2 remote from the light diffusing layer 3.

The transparent substrate may be a resin sheet which is permeable to an ionizing radiation and flexible. The thickness of the transparent substrate is preferably in the range of about 12 to 200 $\mu$m, for example, from the viewpoint of reducing the weight and thickness of the display device used.

Preferred materials for the transparent substrate include: polyesters, such as polyethylene terephthalate and polyethylene naphthalate; polymers of methacrylic esters or acrylic esters (the so-called "acrylic resins"), such as polymethyl methacrylate, polymethyl acrylate, polyethyl methacrylate, and polyethyl acrylate; polycarbonates; cellulose triacetate; polystyrene; and polypropylene.

If necessary, the transparent substrate is preferably subjected to corona discharge treatment or other treatment for imparting easy-adhesion properties to the surface of the transparent substrate.

The thickness of the light diffusing layer is about 10 to 200 $\mu$m, preferably 10 to 30 $\mu$m. Materials for the formation of the light diffusing layer are preferably ionizing radiation-curable resins from the viewpoint of easiness in the formation of an ionizing radiation-curable resin layer on the transparent substrate.

The ionizing radiation-curable resin preferably has a composition comprising a suitable mixture of a prepolymer, an oligomer, and/or a monomer, each of the prepolymer, oligomer, and the monomer having in its molecule a polymerizable unsaturated bond or epoxy group. Examples of prepolymers and oligomers usable herein include: unsaturated polyesters, such as condensates of unsaturated dicarboxylic acid with polyhydlic alcohols; epoxy resins; methacrylates, such as polyester methacrylate and polyether methacrylate; and acrylates, such as polyester acrylate, epoxy acrylate, urethane acrylate, polyether acrylate, polyol acrylate, and melamine acrylate.

Preferred monomers include: styrene monomers, such as styrene and $\beta$-methylstyrene; acrylic esters, such as 2-ethylmethylhexyl acrylate, methoxyethyl acrylate, and butyl acrylate; methacrylic esters, such as methyl methacrylate, ethyl methacrylate, methoxyethyl methacrylate, and ethoxymethyl methacrylate; substituted amino alcoholic esters of unsaturated acids, such as 2-(N, N-dimethylamino)ethyl acrylate; unsaturated carboxylic amide, such as acrylamide and methacrylamide; polyfunctional compounds, such as dipropylene glycol diacrylate, ethylene glycol acrylate, propylene glycol dimethacrylate, and diethylene glycol dimethacrylate; vinyl pyrrolidone; and polythiol compounds having two or more thiol groups in the molecule thereof, for example, trimethylolpropane trithioglycolate, trimethylolpropane trithiopropylate, and pentaerythritol tetrathioglycol.

When the ionizing radiation-curable resin is used as an ultraviolet-curable resin, this resin may be mixed with a photopolymerization initiator, preferably an acetophenone compound, a benzophenone compound, a Michler's benzoyl benzoate, an $\alpha$-amyloxime ester, or a thioxanthone compound and/or a photosensitizer, such as n-butylamine, triethylamine, or tri-n-butylphosphine.

The thickness of the matte layer is preferably about 1 to 100 $\mu$m, most preferably 5 to 10 $\mu$m. A light-transparent resin with resin particles dispersed therein may be used as a material for the matte layer.

Preferred light-transparent resins include polyester resins, acrylic resins, polystyrene resins, polyvinyl chloride resins, polyethylene resins, polypropylene resins, polyurethane, resins, polyamide resins, epoxy resins, cellulosic resins, organosiloxane resins, polyimide resins, polysulfone resins, and polyarylate resins.

Among them, polyester resins are particularly preferred from the viewpoints of easiness in the regulation of the difference in refractive index from that of the acrylic particles, wettability, adhesion to the transparent substrate, or the scratch resistance, lightfastness, transparent and other properties of the resin per se.

Preferred resin particles include resin particles of polymers of methacrylic esters or acrylic esters (the so-called "acrylic resins"), such as polymethyl methacrylate, polyethyl methacrylate, polybutyl methacrylate, polypropyl methacrylate, polymethyl acrylate, polyethyl acrylate, polybutyl acrylate, and polypropyl acrylate, polymers of aromatic vinyl monomers, such as polystyrene, polyvinyltoluene, poly-$\alpha$-methylstyrene, and polyhalogenated styrene, and polymers of crosslinkable monomers, such as polyallyl methacrylate and polytriallyl cyanurate.

The average particle diameter is preferably 1 to 50 $\mu$m, more preferably 3 to 10 $\mu$m. These resin particles may be particles of a single type or particles of a combination of two or more types. The matte layer may optionally contain photostabilizers, heat stabilizers, antistatic agents, and other additives.

Figure 3:
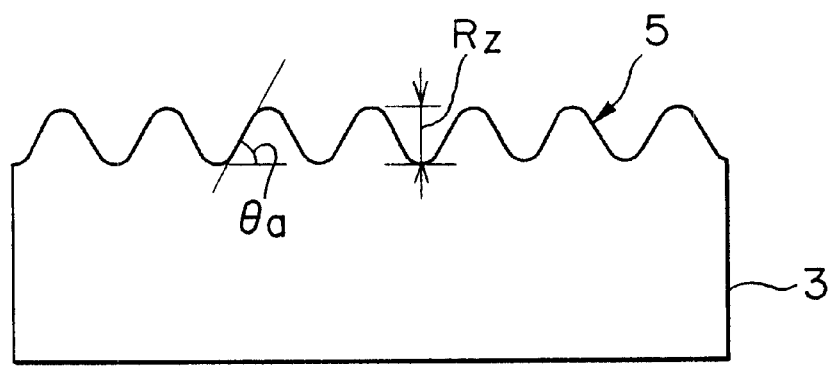
FIG. 3 is an enlarged schematic cross-sectional view showing the basic construction of a light diffusing layer according to the present invention.

The light diffusing film according to one embodiment of the present invention comprises a transparent substrate and a light diffusing layer provided on the transparent substrate, the light diffusing layer being free from light diffusing particles and formed of an ionizing radiation-cured resin having on its surface fine concaves and convexes, the light diffusing layer having a surface roughness of 1 to 10 m in terms of ten-point average roughness Rz and an average inclination θa of 5 to 20 degrees. FIG. 3 is an enlarged cross-sectional view of the light diffusing layer. In FIG. 3, numeral 5 designates fine concaves and convexes on the surface of the light diffusing layer.

The light diffusing layer according to the present invention can efficiently diffuse light. The presence of light diffusing particles in the light diffusing layer means the interminglement of a material having a refractive index different from the resin constituting the light diffusing layer, disadvantageously resulting in increased light loss.

When the ten-point average roughness Rz is less than 1 μm, the light diffusing properties are deteriorated. This is disadvantageously detrimental to the ability of the light diffusing layer to conceal scattering dots of the light-guide plate. On the other hand, when the ten-point average roughness Rz is more than 10 μm, the light diffusing properties are excessively enhanced. This disadvantageously deteriorates the frontal luminance.

When the average inclination θa is less than 5 degrees, the light diffusing properties are deteriorated. This is disadvantageously detrimental to the ability of the light diffusing layer to conceal scattering dots of the light-guide plate. On the other hand, when the average inclination θa is more than 20 degrees, the light diffusing properties are excessively enhanced. This disadvantageously deteriorates the frontal luminance.

The ten-point average roughness Rz referred to herein is a measured value based on JIS B 0601-1994. More specifically, a reference length is sampled from a profile curve of an object, and an average line is determined, followed by the calculation of a difference between the average value of the heights of five highest profile peaks and the depths of five deepest profile valleys. This difference value is regarded as the ten-point average roughness Rz.

The average inclination θa may be measured in the same manner as used in the measurement of the ten-point average roughness Rz, and defined as the average value of the angle of an average line of a reference length sampled from a profile curve of an object to the profile curve.

Embodiments of the surface light source and the display device using the above light diffusing film will be described.

Figure 4:
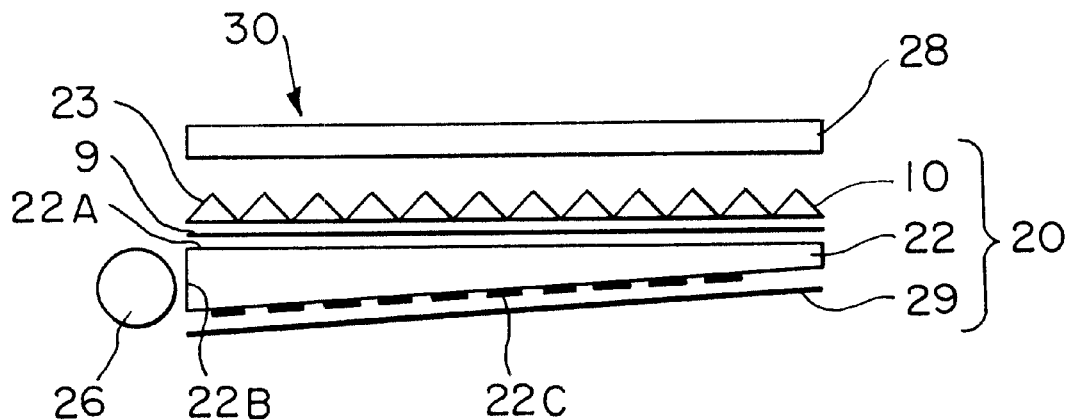
FIG. 4 is a schematic cross-sectional view showing the basic construction of the surface light source and the display device according to the present invention.

As shown in FIG. 4, a surface light source 20 comprises: a light-guide material 22 having a flat luminous radiation surface 22A; a lens film 10 provided with unit lenses 23, the lens film 10 being disposed parallel to the light-guide material 22 so that the luminous radiation surface 22A faces the flat surface of the lens film 10 remote from the unit lenses 23; a light diffusing film 9 interposed between the lens film 10 and the luminous radiation surface 22A; and a light source lamp 26 light from which enters the light-guide material 22 from one side end 22B of the light-guide material 22. Light incident to the light-guide material 22 through the one side end 22B exits the luminous radiation surface 22A in a direction toward the lens film 10, whereby, for example, in FIG. 4, a liquid crystal panel 28 disposed above the lens film 10 is illuminated from behind. Thus, the surface light source 20, together with the liquid crystal panel 28, constitutes a liquid crystal display device 30.

In FIG. 4, a reference character 22C designates scattering dots provided on the backside (under surface) of the light-guide material 22, that is, the surface of the light-guide material 22 remote from the luminous radiation surface 22A. Numeral 29 designates a reflection sheet which is disposed so as to cover the underside of the light-guide material 22 in FIG. 4 and serves to reflect light, which has exited downward from the light-guide material 22, to return the light to the inside of the light-guide material 22.

A lens film 10 is used in the surface light source 20 in FIG. 4. When the lens film is unnecessary, the provision of the lens film may be omitted. Further, two lens films may be used. In this case, preferably, the two lens films are disposed in such a manner that ridge lines of unit lens in one lens film intersect the ridge lines of unit lens in the other lens film.

Figure 5:
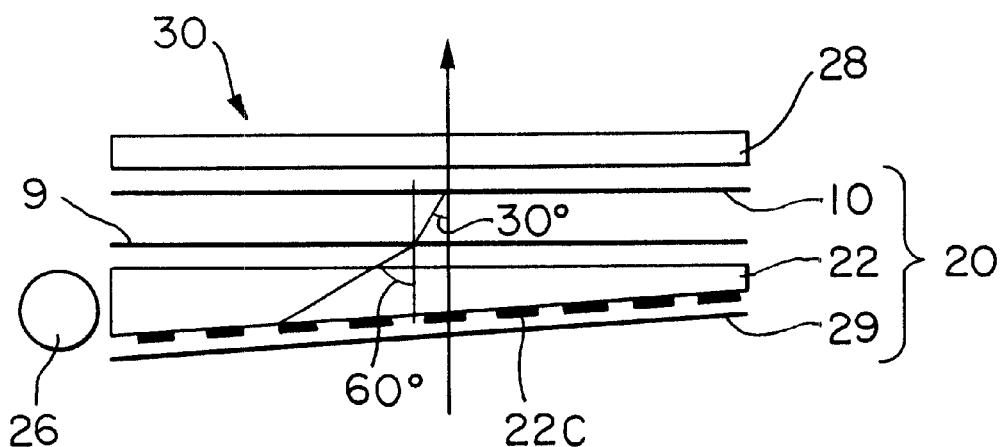
FIG. 5 is a schematic diagram showing one embodiment of incidence of light on a light diffusing layer and outgoing of the light from the light diffusing layer according to the present invention.

According to the present invention, when the angle of light incident to the light diffusing film is 60 to 80 degrees, the angle of outgoing of light from the light diffusing film is 30 to 50 degrees. The light then enters a prism sheet. Thereafter, the light is condensed by the prism sheet. Thus, the luminance of light exiting from the prism sheet in a direction toward the liquid crystal panel can be enhanced. One embodiment is shown in FIG. 5 wherein the angle of incidence is 60 degrees and the angle of outgoing is 30 degrees.

Further, since the haze of the light diffusing film is not less than 80%, as viewed from the liquid crystal panel side, the scattering dots in the light-guide plate can be surely concealed by the light diffusing film.

Figure 6:
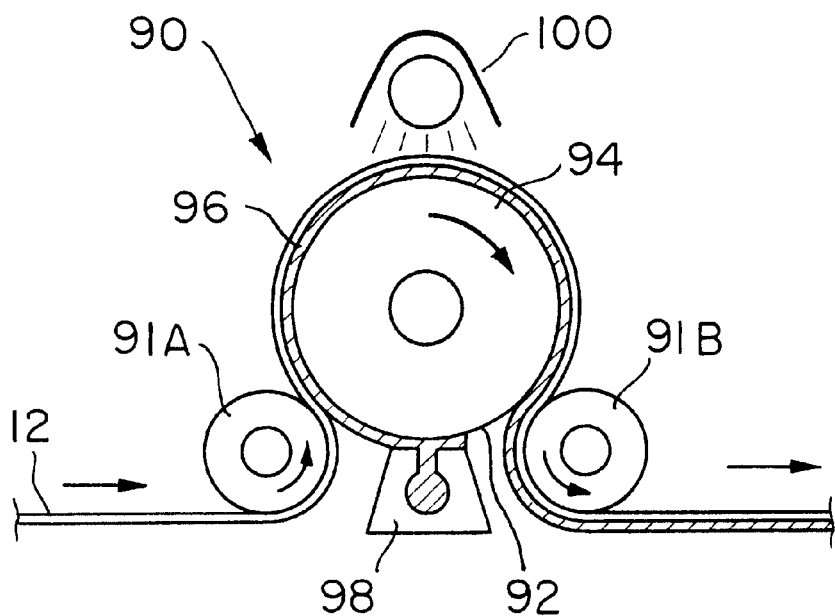
FIG. 6 is a schematic diagram showing an apparatus for producing the light diffusing film according to the present invention.

Next, a process for producing the above light diffusing film will be described with reference to FIG. 6.

An apparatus 90 for producing a light diffusing film, which is used in practicing this production process, is such that a light diffusing layer is coated and cured on the surface of a transparent substrate 12 being wound around a roll form 94 having thereon the above-described fine concaves and convexes.

More specifically, the fine concaves and convexes 92 are continuously supplied (coated) with a liquid ultraviolet-curable resin 96 from a coater 98 disposed on the underside of the roll form 94 so as to contact the circumference of the roll form 94. The resin 96 contained in the fine concaves and convexes 92 is brought into contact with the transparent substrate 12 on its inner surface wound on the roll form 94 by means of inlet and outlet guide rolls 91A, 91B, while a predetermined quantity of ultraviolet light is applied from an ultraviolet irradiation device 100 to the ultraviolet-curable resin 96 contained in the fine concaves and convexes 92 through the transparent substrate 12. Thus, the resin 96 is cured in such a state that the resin is in contact with the transparent substrate 12.

The viscosity of the liquid ultraviolet-curable resin 96 is preferably not more than 5,000 cps, particularly preferably not more than 1,000 cps, from the viewpoint of faithfully conforming the ultraviolet-curable resin 96 to the shape of the fine concaves and convexes 92.

When the transparent substrate 12 is alienated from the roll form 94 along the outlet guide roll 91B in such a state that the resin 96 has been adhered to the transparent substrate 12, the cured resin 96 is left from the fine concaves and convexes 92.

Thereafter, if necessary, as described above, a matte layer may be stacked.

According to this production process, a resin can be formed in conformity with the shape of a previously designed roll form having thereon concaves and convexes. This can realize faithful reproduction of desired shape of fine concaves and convexes. Therefore, a light diffusing film having desired diffusing properties can be produced with high accuracy, and, in addition, a variation in diffusing properties from place to place in a screen is less likely to occur. Furthermore, uneven coating, which has been likely to occur in the conventional light diffusing film, is less likely to occur.

Further, fine concaves and convexes are formed by a rotary molding method using a roll form having thereon concaves and convexes while traveling a sheet substrate of a strip web. Further, the molding is immediately cured by irradiation with an ionizing radiation. Therefore, the light diffusing film can be continuously produced at low cost.

EXAMPLE

The present invention will be described in more detail with reference to the following example.

Example 1

A 125 μm-thick polyethylene naphthalate film (A 4300: tradename, manufactured by Toyobo Co., Ltd.) was provided as a transparent substrate. An about 20 μm-thick light diffusing layer was formed using an ultraviolet-curable resin (Seika Beam XD-808: tradename, manufactured by Dainichiseika Color & Chemicals Manufacturing. Co., Ltd.) by the above-described production process of a light diffusing film on the transparent substrate. Thereafter, a coating liquid composed of 200 parts by weight of a polyester resin (Vylon 200: tradename, manufactured by Toyobo Co., Ltd.), 3 parts by weight of resin particles (Aerosil OK 412: tradename of microsilica, manufactured by Nippon Aerosil Co., Ltd.; average particle diameter 4 μm), 20 parts by weight of toluene, 20 parts by weight of MEK, and a curing agent (XEL curing agent: tradename, manufactured by The Inctec Inc.) was coated onto the transparent substrate in its side remote from the light diffusing layer. The coating was dried to form an about 5 μm-thick matte layer. Thus, a light diffusing film was prepared.

Commercially available light diffusing films, wherein a light diffusing layer composed of light diffusing particles dispersed in a light transparent resin was formed on a transparent substrate film and had on its surface concaves and convexes, were used as Comparative Examples 1 and 2. The commercially available light diffusing films used were D121 (tradename, manufactured by Tsujimoto Denki) for Comparative Example 1 and BS-01 (tradename, manufactured by KEIWA Inc.) for Comparative Example 2.

For these light diffusing films, the haze and the total light transmittance were as shown in Table 1, and the properties of the concaves and convexes provided on the surface of the light diffusing layer were as shown in Table 2.

TABLE 1

|  | Total light transmittance, % | Haze |
|---|---|---|
| Ex. 1 | 83.5 | 89.9 |
| Comp. Ex. 1 | 70.6 | 90.9 |
| Comp. Ex. 2 | 73.2 | 88.5 |

TABLE 2

|  | Ten-point average roughness Rz, μm | Average inclination Θa, deg |
|---|---|---|
| Ex. 1 | 7.49 | 13.2 |
| Comp. Ex. 1 | 19.48 | 21.5 |
| Comp. Ex. 2 | 12.36 | 20.9 |

Figure 7:
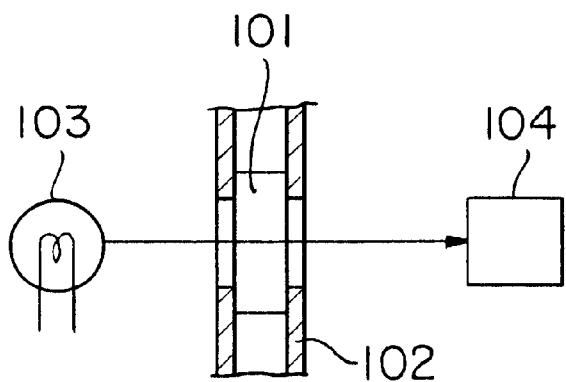
FIG. 7 is a schematic diagram showing a method for measuring the haze and total light transmittance of the light diffusing film according to the present invention.

The haze was measured with a haze meter manufactured by Toyo Seiki Seisaku Sho, Ltd. More specifically, as shown in FIG. 7, a light diffusing film 101 of the example or the comparative examples was sandwiched and held by a fixture 102. The light diffusing film was exposed from the front thereof to light emitted from a light source 103. The transmitted light was received by a photodetecting section 104 from the front thereof. The total light transmittance was also measured in the same manner as described above.

The surface roughness was measured with a surface roughness meter SURFCORDER SE-30K, manufactured by Kosaka Laboratory Ltd., under conditions of measuring length 2.5 mm, measuring speed 0.1 mm/sec, measuring force 0.7 mN, and stylus tip diameter 2 μm.

Light was applied to the light diffusing film prepared in Example 1 at an angle of incidence of 80 degrees. As a result, the angle of outgoing of light was 40 degrees.

Each of the above light diffusing films was incorporated into a surface light source 20 having a construction as shown in FIG. 4. As a result, the luminance distribution of the surface light source was shown in FIG. 8. EZ Contrast 16R manufactured by ELDIM was used in the measurement of the luminance distribution.

Figure 8:
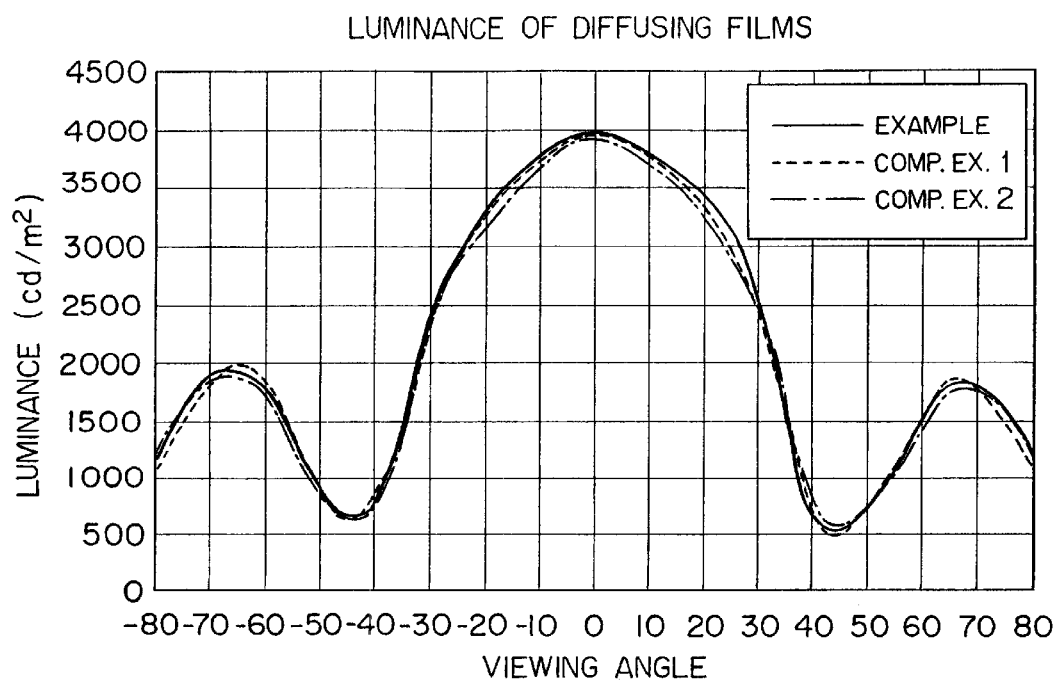
FIG. 8 is a diagram showing the distribution of luminance of a surface light source using the light diffusing film according to the present invention.
Figure 9:
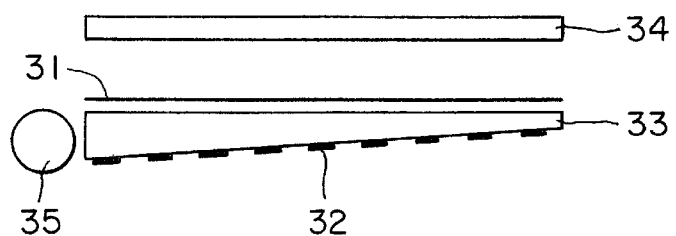
FIG. 9 is a schematic cross-sectional view showing a prior art technique.

As can be seen from FIG. 8, the light diffusing film of Example 1 according to the present invention, as compared with the comparative light diffusing films, had clearly improved luminance at an angle of visibility of 10 to 30 degrees.

What is claimed is:

1. A light diffusing film comprising:
   a transparent substrate; and
   a light diffusing layer formed on at least one side of the transparent substrate, the light diffusing layer being formed of an ionizing radiation-cured resin,
   the light diffusing layer having on its surface fine concaves and convexes, the light diffusing layer having a surface roughness of 1 to 10 μm in terms of ten-point average roughness Rz, the fine concaves and convexes having an average inclination Θa of 5 to 20 degrees, and the light diffusing film being so constructed to have a haze of 85 to 95% and a total light transmittance of 80 to 90%.

2. The light diffusing film according to claim 1, wherein the light diffusing layer is substantially free from light diffusing particles.

3. The light diffusing film according to claim 1, which has been constructed so that, when the angle of incidence of light on the light diffusing layer is 60 to 80 degrees to a normal of the light diffusing layer, a peak of the angle of outgoing of light is 30 to 50 degrees to the normal of the light diffusing layer.

4. The light diffusing film according to claim 1, which further comprises a matte layer on the transparent substrate on its side remote from the light diffusing layer.

5. A surface light source comprising:
   a light-guide plate which permits light to enter therein from a side end thereof and to go out from an outgoing face orthogonal to an incident face;
   a light source installed on at least one end of the light-guide plate; and
   the light diffusing film according to claim 1 provided on an outgoing face of the light-guide plate.

6. The surface light source according to claim 5, which further comprises a prism sheet provided on the light diffusing film.

7. A display device comprising a display panel provided on the surface light source according to claim 5.

* * * * *